(12) United States Patent
Shin et al.

(10) Patent No.: US 10,694,287 B2
(45) Date of Patent: Jun. 23, 2020

(54) WATERPROOF SOUND-TRANSMITTING SHEET

(71) Applicant: AMOGREENTECH CO., LTD., Gimpo-si, Gyeonggi-do (KR)

(72) Inventors: Kang-Sik Shin, Incheon (KR); In-Yong Seo, Seoul (KR); Ba-Wool Yoo, Seoul (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/301,050

(22) PCT Filed: May 11, 2017

(86) PCT No.: PCT/KR2017/004886
§ 371 (c)(1),
(2) Date: Nov. 13, 2018

(87) PCT Pub. No.: WO2017/196101
PCT Pub. Date: Nov. 16, 2017

(65) Prior Publication Data
US 2019/0191242 A1 Jun. 20, 2019

(30) Foreign Application Priority Data

May 13, 2016 (KR) .................. 10-2016-0058807
May 13, 2016 (KR) .................. 10-2016-0058808
Jan. 26, 2017 (KR) .................. 10-2017-0012651

(51) Int. Cl.
*H04R 1/44* (2006.01)
*B32B 5/02* (2006.01)
(Continued)

(52) U.S. Cl.
CPC ............... *H04R 1/44* (2013.01); *B32B 5/022* (2013.01); *B32B 5/028* (2013.01); *B32B 7/12* (2013.01);
(Continued)

(58) Field of Classification Search
CPC .......... H04R 1/44; G10K 11/18; B32B 5/022
See application file for complete search history.

(56) References Cited

U.S. PATENT DOCUMENTS

2014/0332310 A1* 11/2014 Seo .................. B32B 7/12
181/211
2015/0001000 A1* 1/2015 Seo .................. G10K 11/18
181/211

(Continued)

FOREIGN PATENT DOCUMENTS

| CN | 102186368 A | 9/2011 |
| CN | 104159743 A | 11/2014 |

(Continued)

OTHER PUBLICATIONS

Office Action issued in Chinese Application No. 201780032725.0, dated Dec. 3, 2019.

*Primary Examiner* — Regina N Holder
(74) *Attorney, Agent, or Firm* — Baker & Hostetler LLP (57) ABSTRACT

Disclosed is a waterproof sound-transmitting sheet, which includes a waterproof layer of a nonporous material and a support layer of a porous material, and maintains waterproof performance and sound transmission performance at a water pressure of about 10 atm. The disclosed waterproof sound-transmitting sheet includes a waterproof layer formed of a film shape of a nonporous material, a first adhesive layer having one surface adhered to one surface of the waterproof layer, and a support layer formed of a film shape of a porous material, and having one surface adhered to the other surface (Continued)

of the adhesive layer; and the support layer can be composed of metal mesh or nonwoven fabric.

12 Claims, 8 Drawing Sheets

(51) Int. Cl.
*G10K 11/18* (2006.01)
*B32B 7/12* (2006.01)
*H04R 7/08* (2006.01)

(52) U.S. Cl.
CPC ............... *G10K 11/18* (2013.01); *H04R 7/08* (2013.01); *B32B 2307/7265* (2013.01); *G10K 2200/11* (2013.01); *G10K 2210/127* (2013.01); *G10K 2210/3214* (2013.01); *G10K 2210/3223* (2013.01); *H04R 2307/025* (2013.01); *H04R 2307/027* (2013.01); *H04R 2307/029* (2013.01)

(56) References Cited

U.S. PATENT DOCUMENTS

2015/0373439 A1* 12/2015 Mori ..................... H04M 1/03
                                                          381/334
2017/0026742 A1*  1/2017 Karube ................... H04R 1/44

FOREIGN PATENT DOCUMENTS

| JP | 2015142282 A | 8/2015 |
| KR | 2010-0041839 A | 4/2010 |
| KR | 2011-0074869 A | 7/2011 |
| KR | 2013-0129104 A | 11/2013 |
| KR | 2014-0075629 A | 6/2014 |
| KR | 2015-0087201 A | 7/2015 |
| KR | 2015-0122693 A | 11/2015 |

* cited by examiner

WATERPROOF SOUND-TRANSMITTING SHEET

CROSS-REFERENCE TO RELATED APPLICATIONS

This application is a National Stage of International patent application PCT/KR2017/004886, filed on May 11, 2017, which claims priority to foreign Korean patent application Nos. KR 10-2016-0058807 and 10-2016-0058808, filed on May 13, 2016, and Korean patent application No. 10-2017-0012651, filed on Jan. 26, 2017, the disclosures of which are incorporated by reference in their entireties.

FIELD OF THE INVENTION

The present disclosure relates to a waterproof sound-transmitting sheet, and more particularly, to a waterproof sound-transmitting sheet for increasing sound transmission efficiency and enhancing waterproof performance.

BACKGROUND

In recent years, mobile electronic appliances, such as a portable terminal, a digital camera, and a notebook, have increasingly been used. Such a mobile electronic appliance needs to have waterproof function because it is for portable use and thereby there is a risk of falling into water. That is, an acoustic hole for emitting sound is formed on a portion where a speaker, a microphone, etc. is installed, and water or dust permeates into the electronic appliance through the acoustic hole.

Accordingly, the acoustic hole is provided with a waterproof sound-transmitting sheet for passing through sound and blocking water or dust. Such a waterproof sound-transmitting sheet should be manufactured considering both waterproof performance and sound transmission efficiency.

Regarding the waterproof sound-transmitting sheet, Korean Patent Publication No. 10-2010-0041839 (Apr. 22, 2010) discloses a configuration that is composed of a porous polytetrafluoroethylene film. However, there is a problem in that the conventional waterproof sound-transmitting film is composed of only a porous polytetrafluoroethylene film, such that the micropores of the porous film gradually become larger due to externally-applied impact or sound pressure as the use period becomes long, thus reducing waterproof performance.

In order to solve the problem, a waterproof sound-transmitting sheet composed of a waterproof layer and a support layer has been conventionally developed. In this time, since waterproof performance at a water pressure of about 1 atm (BAR, about 10 m) has been required conventionally, the waterproof sound-transmitting sheet of a structure stacking the waterproof layer composed of a porous material for waterproof, and a protective layer configured to be moved by sound pressure for sound-transmission has been developed.

Meanwhile, waterproof performance at a water pressure of about 5 atm (BAR, about 50 m) has been recently required while consumer interest in waterproof performance rapidly increases.

However, there is a problem in that the conventional waterproof sound-transmitting sheet has the waterproof layer composed of a porous material, such that when a water pressure of about 5 atm is applied thereto, the hole of the waterproof layer becomes large gradually, or the waterproof layer is broken due to the collision between the waterproof layer and the protective layer, thus reducing waterproof performance.

In addition, the conventional waterproof sound-transmitting sheet is designed based on a water pressure of about 1 atm, such that when a water pressure of about 5 atm required recently is applied thereto continuously, the waterproof layer is lost in elasticity and thereby is not restored in the state of being stretched toward the protective layer. Accordingly, there is a problem in that in the conventional waterproof sound-transmitting sheet, sound loss and noise due to the collision between the protective layer moved by the sound pressure of a speaker or a microphone and the stretched waterproof layer occur, thus reducing sound transmission performance.

In addition, there is a problem in that the conventional waterproof sound-transmitting sheet is formed with the protective layer to be moved by the sound pressure, such that when the sound pressure of a speaker or a microphone is generated while the water pressure is applied thereto, the waterproof layer is broken by the collision between the waterproof layer and the protective layer, thus reducing waterproof performance, or sound loss and noise occur, thus reducing sound transmission performance.

In addition, there is a problem in that the conventional waterproof sound-transmitting sheet is adhered to a portable terminal through a thin film type adhesive layer, such that when a water pressure of about 5 atm is applied thereto, the waterproof layer is stretched and thereby the adhesive layer is separated from the portable terminal, thus reducing waterproof performance.

SUMMARY OF THE INVENTION

The present disclosure is intended to solve the above problems, and an object of the present disclosure is to provide a waterproof sound-transmitting sheet, which is composed of a waterproof layer of a nonporous material and a support layer of a porous material, thus maintaining waterproof performance and sound transmission performance at a water pressure of about 10 atm or less.

For achieving the object of the present disclosure, a waterproof sound-transmitting sheet in accordance with an embodiment of the present disclosure includes a waterproof layer formed in a film shape; a first adhesive layer located on the lower portion of the waterproof layer, and a support layer composed of a porous material and located on the lower portion of the first adhesive layer; and the support layer is a selected one of metal mesh and nonwoven fabric.

The metal mesh is a shape having a plurality of pores punched on a thin film metal plate that is a selected one of SUS, aluminum (Al), and an alloy of the SUS and nickel (Ni), or has a metal wire, which is a selected one of SUS, aluminum (Al), and an alloy of the SUS and nickel (Ni), formed to intersect thereon.

The support layer is formed with an internal pressure transmission hole for transmitting the internal pressure between an applied device and the support layer to the outside, and the waterproof layer can be a nonporous material.

The support layer can be nonwoven fabric containing one selected from polyethylene terephthalate (PET), polypropylene (PP), polyethylene (PE), and Nylon.

The waterproof layer can contain one selected from latex, Polyurethane (PU), and Thermoplastic Poly Urethane (TPU) that have elasticity, or can be a membrane that is formed by spinning the spinning solution containing a polymer material on a web through electrospinning.

The first adhesive layer can include a single-sided adhesive film located on the lower surface of the waterproof layer; and a hot melt interposed between the single-sided adhesive film and the waterproof layer.

The waterproof sound-transmitting sheet in accordance with an embodiment of the present disclosure can further include a second adhesive layer interposed between the support layer and a speaker or a microphone of an applied device, and the second adhesive layer can be formed with a hole for sound transmission. In this time, the second adhesive layer can include a double-sided adhesive film located on the lower portion of the support layer and a single-sided adhesive film interposed between the double-sided adhesive film and the speaker or the microphone.

The waterproof sound-transmitting sheet in accordance with an embodiment of the present disclosure can further include a third adhesive layer interposed between the waterproof layer and a case of an applied device, and the third adhesive layer can be formed with a hole for sound transmission.

According to the present disclosure, the waterproof sound-transmitting sheet can be formed by stacking the waterproof layer of the elastic and nonporous type, the adhesive layer, and the support layer of a porous material, thus maintaining sound transmission performance and waterproof performance even under a water pressure of about 10 atm or less.

In addition, the waterproof sound-transmitting sheet can form pores on the support layer so that the movement is not caused by sound pressure, thus preventing the collision between the protective layer and the waterproof layer from occurring even when the water pressure and the sound pressure are applied thereto simultaneously, and preventing sound loss and noise from occurring. This means that the waterproof sound-transmitting sheet can prevent sound transmission performance from reducing even when water pressure and sound pressure are simultaneously applied thereto.

In addition, the waterproof sound-transmitting sheet can form pores on the support layer so that the movement is not caused by sound pressure, thus preventing the collision between the protective layer and the waterproof layer from occurring even when the water pressure and the sound pressure are applied thereto simultaneously, and preventing the waterproof layer from being broken, thus preventing waterproof performance from reducing.

In addition, the waterproof sound-transmitting sheet has the support layer spaced apart from the lower portion of the waterproof layer to maintain the stretch of the waterproof layer by the water pressure within the spacing interval, thus preventing the reduction in waterproof performance caused by separation of the adhesive layer and the applied device.

In addition, the waterproof sound-transmitting sheet is formed with the support layer composed of metal mesh, thus enhancing waterproof performance as compared with the waterproof sound-transmitting sheet formed with the support layer composed of nonwoven fabric. That is, the waterproof sound-transmitting sheet can maintain waterproof performance up to about 5 atm in the support layer composed of nonwoven fabric, while it can maintain waterproof performance up to about 10 atm in the support layer composed of metal mesh.

DETAILED DESCRIPTION

Hereinafter, the most preferred embodiment of the present disclosure will be described with reference to the accompanying drawings so that those skilled in the art to which the present disclosure pertains can easily practice the technical spirit of the present disclosure.

Figure 1:
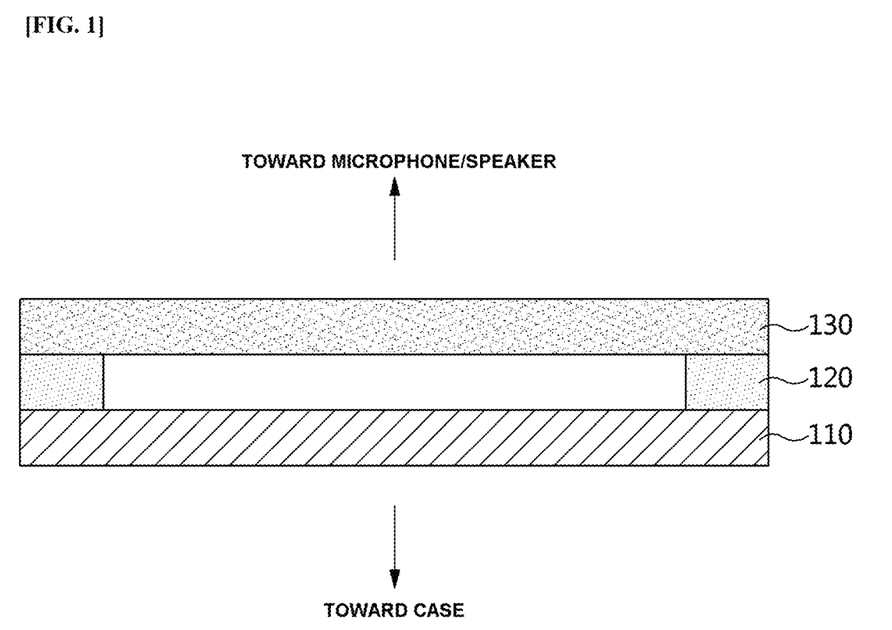
FIG. 1 is a diagram for explaining a waterproof sound-transmitting sheet in accordance with a first embodiment of the present disclosure.

As illustrated in FIG. 1, a waterproof sound-transmitting sheet in accordance with a first embodiment of the present disclosure is formed by stacking a waterproof layer 110 of an elastic and nonporous type, a first adhesive layer 120, and a support layer 130. Herein, in FIG. 1, the thicknesses of the waterproof layer 110, the first adhesive layer 120, and the support layer 130 have been illustrated to be the same for ease of explanation, but the thicknesses of the respective layers can be different from each other.

That is, the waterproof sound-transmitting sheet is configured to stack the waterproof layer 110, the first adhesive layer 120, and the support layer 130 by adhering the upper surface of the first adhesive layer 120 to the lower surface of the waterproof layer 110, and adhering the upper surface of the support layer 130 to the lower surface of a second adhesive layer 140.

In this time, when the support layer 130 is located toward an acoustic hole formed on a case of an applied device and the waterproof layer 110 is located toward a microphone or a speaker module located in the applied device, water can be flowed into through pores (hole) formed on the support layer 130 and thereby waterproof performance cannot be implemented.

Accordingly, the waterproof layer 110 is located toward the acoustic hole formed on the case of the applied device, and the support layer 130 is located toward the microphone or the speaker module located in the applied device.

Figure 2:
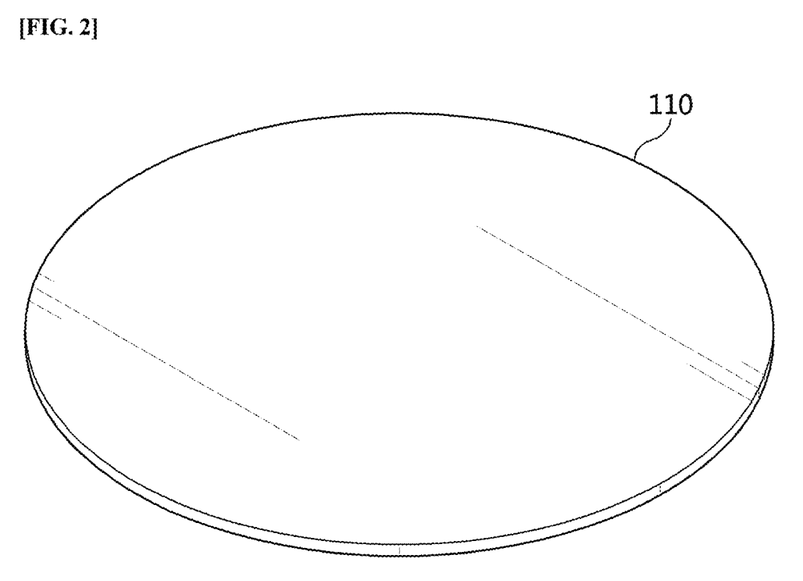
FIG. 2 is a diagram for explaining a waterproof layer of FIG. 1.

Referring to FIG. 2, the waterproof layer 110 is formed of a thin film in a predetermined shape. In this time, the waterproof layer 110 is formed on the applied device in the form of a thin film in various shapes such as a circular shape, an elliptical shape, a square shape, or a hexagonal shape according to the acoustic hole, an internal coupling structure, etc.

Generally, since a device to which the waterproof sound-transmitting sheet is applied has an acoustic hole in a very small circular shape, the waterproof layer 110 is mainly formed in a circular shape or an elliptical shape.

In addition, the waterproof layer 110 can be formed of a thin film having a thickness of about 20 μm to 100 μm according to sound transmission performance and waterproof performance required by the applied device. In this time, the waterproof layer 110 can be also formed in a thickness of 20 μm or less and 100 μm or more considering a thickness of the applied device. Herein, the waterproof layer 110 has the highest sound transmission and waterproof properties at a thickness of about 20 μm.

The waterproof layer 110 can be composed of a high elastic (high flexible) and nonporous material in order to provide waterproof performance at a high water pressure. For example, the waterproof layer 110 can be composed of a high elastic material such as latex, Polyurethane (PU), or Thermoplastic Poly Urethane (TPU).

The waterproof layer 110 in accordance with the present embodiment can be composed of a nonporous membrane formed through electrospinning in order to provide waterproof performance at a high water pressure. For example, the waterproof layer 110 can be formed of a high elastic nonporous film by electrospinning a polymer material, forming a polymer material layer on a web, and then heat-treating the polymer material layer to melt the structure on the web.

Herein, the polymer material can use aromatic polyesters such as polyamide, polyimide, polyamideimide, poly (metaphenylene isophthalamide), polysulfone, poly etherketone, polyetherimide, polyethylene terephthalate, polytrimethylene terephthalate, and polyethylene naphthalate, polyphosphazenes such as polytetrafluoroethylene, poly diphenoxaphospazene, and poly {bis[2-(2-methoxyethoxy) phosphazene]}, polyurethane copolymers containing polyurethane and polyetherurethane, cellulose acetate, cellulose acetate butyrate, cellulose acetate propionate, etc. In addition, it can use polyvinylidene fluoride (PVDF), poly (vinylidene fluoride-co-hexafluoropropylene), perfluoropolymers, polyvinyl chloride or polyvinylidene chloride, and copolymers thereof, and polyethyleneglycol derivatives containing polyethyleneglycol dialkyl ether and polyethyleneglycol dialkyl ester, polyoxides containing poly (oxymethylene-oligo-oxy ethylene), polyethylene oxide, and polypropylene oxide, polyacrylonitrile copolymers containing polyvinyl acetate, poly (vinylpyrrolidone-vinyl acetate), polystyrene and polystyrene acrylonitrile copolymers, polyacrylonitrile, polyacrylonitrile methyl methacrylate copolymers, poly methyl methacrylate, polymethyl methacrylate copolymer and a mixture thereof.

When the waterproof layer 110 is formed by using an electrospinning process, it is easy to adjust the thickness to be thin, thus excellently implementing overall sound transmission of the waterproof sound-transmitting sheet. That is, the porous type waterproof sound-transmitting sheet is relatively less sensitive to the thickness of the sheet because it transmits sound through the pores.

However, the nonporous type waterproof sound-transmitting sheet is required to have a thin thickness of the sheet so that sound vibration on one surface thereof can be transmitted to the other surface thereof more effectively.

Accordingly, when using the electrospinning process, it is possible to form the thickness of the waterproof layer 110 as thin as possible, thus forming the waterproof sound-transmitting sheet having excellent sound transmission.

In addition, when the waterproof layer 110 is formed in a nonporous type, it is possible to implement waterproof performance higher than that of the waterproof sound-transmitting sheet including the pore type waterproof layer. That is, when the waterproof layer 110 is formed in a pore type having a plurality of pores with high elasticity, it can withstand a water pressure of about 1 atm to 2 atm, but when a water pressure of about 3 atm or more is applied thereto, the pores can be enlarged by a water pressure applied to the waterproof layer 110, resulting in breakage such as a crack in the waterproof layer, thus reducing waterproof performance. Accordingly, it is preferable that the waterproof sound-transmitting sheet capable of withstanding a water pressure of 5 atm or more in accordance with the present embodiment is formed in a nonporous type waterproof layer 110.

Figure 3:
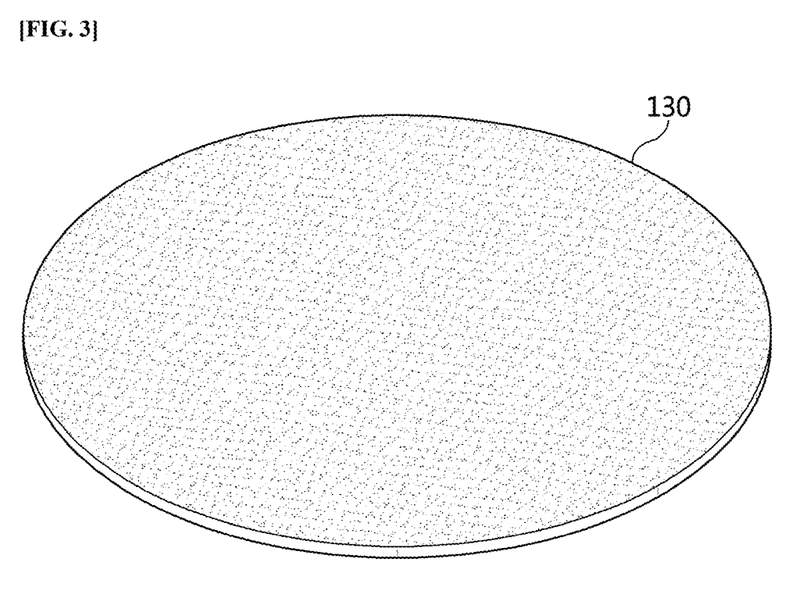
FIG. 3 is a diagram for explaining a first adhesive layer of FIG. 1.

Referring to FIG. 3, the first adhesive layer 120 is formed of a thin film in a predetermined shape having a hole 122 therein. That is, the first adhesive layer 120 is formed of a thin film in various shapes such as a circular shape, an elliptical shape, a square shape, or a hexagonal shape according to the shapes of the waterproof layer 110 and the support layer 130. In this time, the first adhesive layer 120 has the hole 122 for sound transmission formed therein.

The second adhesive layer 140 is formed of a thin film having a predetermined thickness for securing a spacing distance between the waterproof layer 110 and the support layer 130. That is, the second adhesive layer 140 has the upper surface adhered to the lower surface of the waterproof layer 110 and has the lower surface adhered to the upper surface of the support layer 130 to be interposed between the waterproof layer 110 and the support layer 130. In this time, the first adhesive layer 120 is formed to have a thickness of about 50 μm to 200 μm in order to secure the spacing interval between the waterproof layer 110 and the support layer 130.

Figure 4:
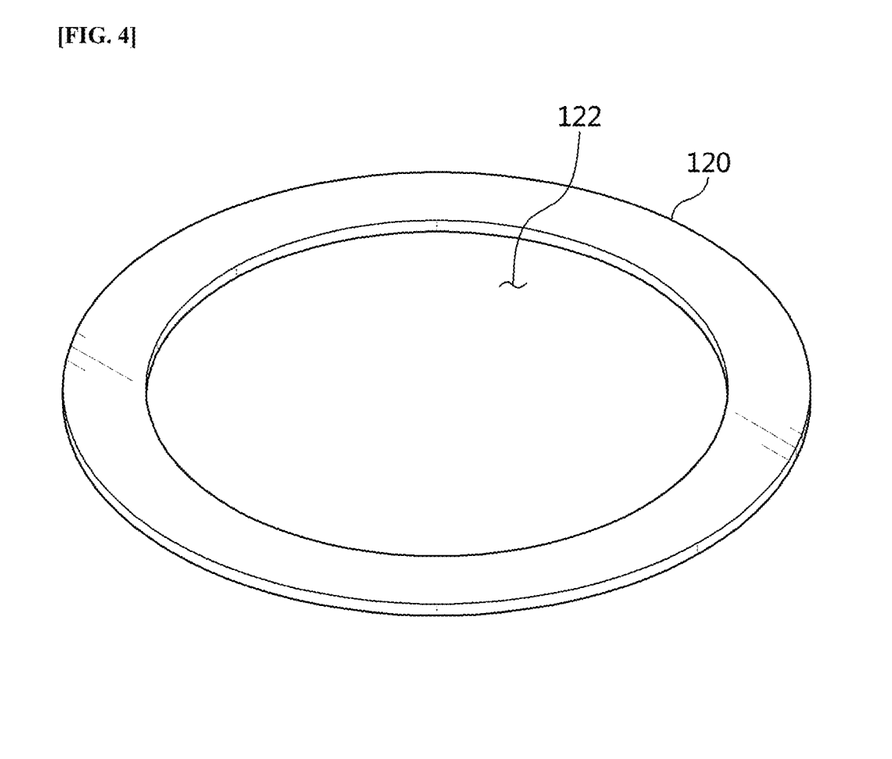
FIG. 4 is a diagram for explaining a support layer of FIG. 1.

Referring to FIG. 4, the support layer 130 is formed of a thin film in a predetermined shape. In this time, the support layer 130 is formed on the applied device in the form of a thin film in various shapes such as a circular shape, an elliptical shape, a square shape, or a hexagonal shape according to an acoustic hole, an internal coupling structure, etc. The support layer 130 can be formed of a thin film having a thickness of about 10 μm to 100 μm according to sound transmission performance and waterproof performance required by the applied device. In this time, the support layer 130 has the highest acoustic performance when it is formed to have a thickness of about 15 μm or more and 20 μm or less.

Meanwhile, when the support layer 130 is formed of a thin film of nonwoven fabric, it can be formed to have a diameter of the fiber constituting nonwoven fabric to be about 1 μm or more and 10 μm or less. Herein, the support layer 130 can be generally formed of a thin film of nonwoven fabric composed of fiber having a diameter of about 5 μm.

The support layer 130 is composed of a porous material having a plurality of pores for sound transmission of a microphone or a speaker. For example, the support layer 130 can be composed of a porous material having a plurality of pores such as nonwoven fabric composed of a material such as polyethylene terephthalate (PET), polypropylene (PP), polyethylene (PE), or Nylon. Herein, the support layer 130 is formed with a plurality of pores having a size (diameter) of about 2 μm to 20 μm.

In this time, in air permeability of 100 cfm or less, sound cannot permeate and thereby acoustic loss occurs. Accordingly, the support layer 130 preferably has a plurality of pores to have the air permeability of about 100 cfm or more.

Meanwhile, when a large amount of pores are formed on the support layer 130, the movement can be caused by sound pressure in the support layer 130. In this case, the collision with the waterproof layer 110 that is stretched by applying water pressure thereto occurs, such that the support layer 130 can prevent the movement due to sound pressure, and it is preferable to form pores enough to maintain the air permeability of 100 cfm or more.

The support layer 130 is located to be spaced at a predetermined interval apart from the waterproof layer 110 in order to prevent the waterproof layer 110 from being stretched by a certain distance or more by applying water pressure thereto. In this time, the support layer 130 forms the spacing interval from the waterproof layer 110 by the thickness of the first adhesive layer 120.

Figure 5:
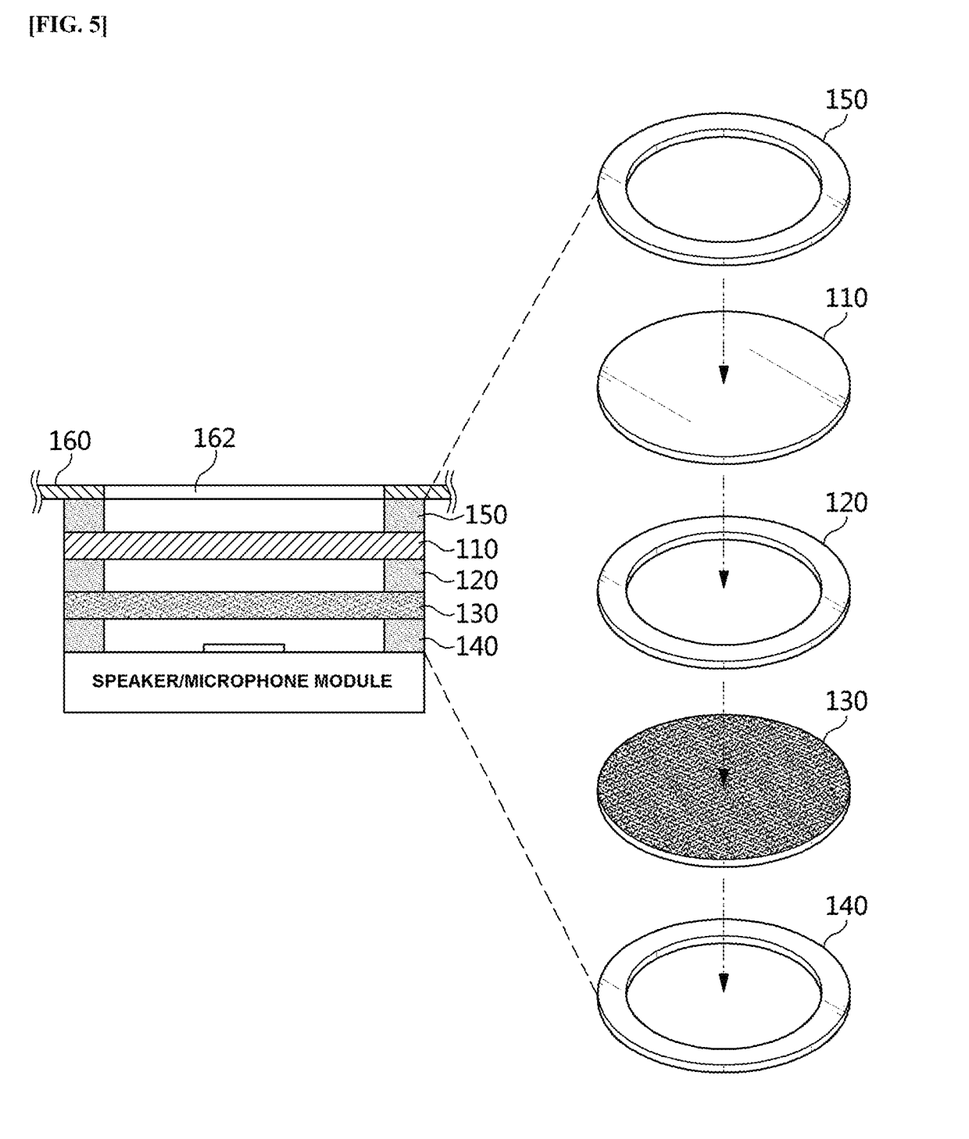
FIG. 5 is a diagram for explaining an example of mounting the waterproof sound-transmitting sheet in an applied device in accordance with the first embodiment of the present disclosure.

Referring to FIG. 5, the waterproof sound-transmitting sheet is mounted on the applied device through the second adhesive layer 140 and a third adhesive layer 150 for implementing waterproof performance and sound transmission performance. Herein, in FIG. 5, the thicknesses of the waterproof layer 110, the first adhesive layer 120, the support layer 130, the second adhesive layer 140, and the third adhesive layer 150 have been illustrated to be the same for ease of explanation, but the thicknesses of the respective layers can be different from each other.

The second adhesive layer 140 has the upper surface adhered to the lower surface of the support layer 130, and has the lower surface adhered to the region where the microphone or the speaker of the applied device is formed.

The third adhesive layer 150 has the lower surface adhered to the upper surface of the waterproof layer 110, and has the upper surface adhered to a case 160 as the case 160 is mounted on the body of the applied device. In this time, the third adhesive layer 150 is adhered to the region where an acoustic hole 162 is formed in the case 160.

As a result, the waterproof sound-transmitting sheet can prevent water, dust, etc. from being flowed into the applied device through the acoustic hole 162 formed on the case 160, and provide sound transmission of the speaker or the microphone.

As described above, the waterproof sound-transmitting sheet is formed by stacking the waterproof layer 110 of an elastic and nonporous type, the adhesive layer, and the support layer 130 of a porous material, thus maintaining sound transmission performance and waterproof performance even at a water pressure of about 5 atm.

In addition, the waterproof sound-transmitting sheet can form pores on the support layer 130 so that the movement is not caused by sound pressure, thus preventing the collision between the protective layer and the waterproof layer 110 even when water pressure and sound pressure are simultaneously applied thereto, and preventing sound loss and noise from occurring. This means that the waterproof sound-transmitting sheet can prevent sound transmission performance from reducing even when water pressure and sound pressure are simultaneously applied thereto.

In addition, the waterproof sound-transmitting sheet can form pores on the support layer 130 so that the movement is not caused by sound pressure, thus preventing the collision between the protective layer and the waterproof layer 110 from occurring even when water pressure and sound pressure are simultaneously applied thereto and preventing breakage of the waterproof layer 110, thus preventing waterproof performance from reducing.

In addition, the waterproof sound-transmitting sheet can be configured so that the support layer 130 is located to be spaced apart from the lower portion of the waterproof layer 110 to maintain the stretch of the waterproof layer 110 due to water pressure within a spacing interval, thus preventing the reduction in waterproof performance caused by separation of the adhesive layer and the applied device.

An object and an effect of the waterproof sound-transmitting sheet in accordance with a second embodiment of the present disclosure are to maintain waterproof performance at a water pressure of 5 atm or more.

Figure 6:
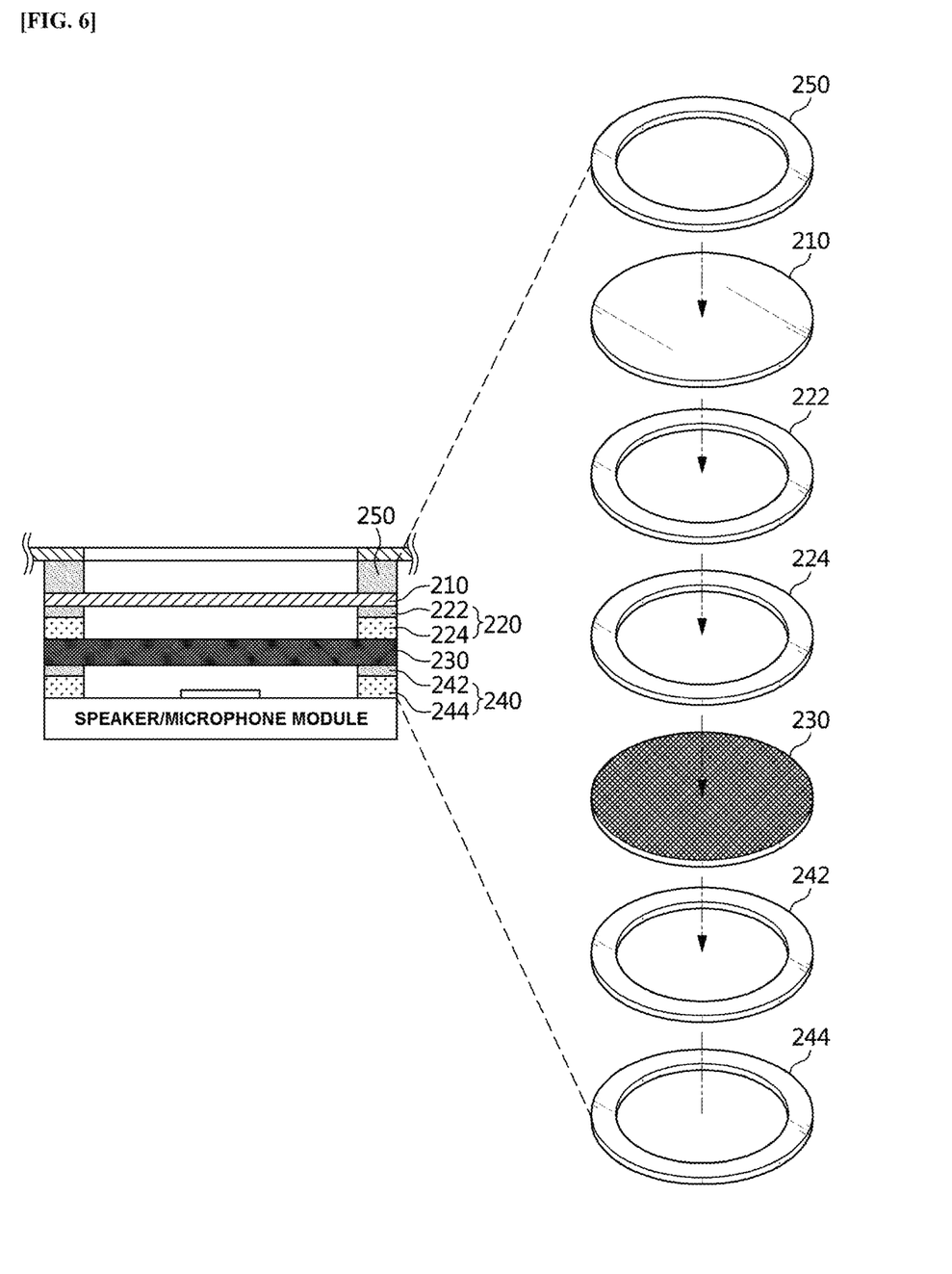
FIG. 6 is a diagram for explaining a waterproof sound-transmitting sheet in accordance with a second embodiment of the present disclosure.

Referring to FIG. 6, a waterproof sound-transmitting sheet in accordance with a second embodiment of the present disclosure is configured to include a waterproof layer 210 of an elastic and nonporous type, a first adhesive layer 220, a support layer 230, a second adhesive layer 240, and a third adhesive layer 250. Herein, in FIG. 6, the thicknesses of the waterproof layer 210, the first adhesive layer 220, the support layer 230, the second adhesive layer 240, and the third adhesive layer 250 have been illustrated to be the same for ease of explanation, but the thicknesses of the respective layers can be different from each other.

The waterproof layer 210 is located toward the case 160, and the support layer 230 is located toward a microphone or a speaker module located in the applied device. In this time, the first adhesive layer 220 is interposed between the upper surface of the waterproof layer 210 and the lower surface of the support layer 230 to bond the waterproof layer 210 and the support layer 230.

The second adhesive layer 240 for bonding the waterproof sound-transmitting sheet to the applied device is located on the upper surface of the support layer 230, and the third adhesive layer 250 for bonding the waterproof sound-transmitting sheet to the case 160 is located on the lower surface of the waterproof layer 210.

The waterproof layer 210 is formed of a thin film in a predetermined shape. In this time, the waterproof layer 210 is formed on the applied device in the form of a thin film in various shapes such as a circular shape, an elliptical shape, a square shape, or a hexagonal shape according to an acoustic hole (not illustrated), an internal coupling structure, etc.

Generally, the waterproof layer 210 is mainly formed in a circular shape or an elliptical shape because a device to which the waterproof sound-transmitting sheet is applied has an acoustic hole (not illustrated) in a very small circular shape.

In addition, for example, the waterproof layer 210 is formed of a thin film having a thickness of about 8 μm to 10 μm according to sound transmission performance and waterproof performance required by the applied device. In this time, the thickness of the waterproof layer 210 can be changed according to the applied device.

The waterproof layer 210 can be composed of a high elastic (high flexible) and nonporous material in order to provide waterproof performance at a high water pressure. For example, the waterproof layer 210 is composed of a high elastic material such as latex, polyurethane (PU), Thermoplastic Poly Urethane (TPU), or a nonporous membrane formed through electrospinning, and can be formed in the nonporous film shape in order to maintain waterproof performance at a high water pressure.

The first adhesive layer 220 is interposed between the upper surface of the waterproof layer 210 and the lower surface of the support layer 230 to bond the waterproof layer 210 and the support layer 230. The first adhesive layer 220 can be formed of a thin film in various shapes such as a circular shape, an elliptical shape, a square shape, or a hexagonal shape according to the shapes of the waterproof layer 210 and the support layer 230. In this time, the first adhesive layer 220 can have a hole for sound transmission formed therein.

The first adhesive layer 220 can be formed of a thin film having an adhesive surface formed on both surfaces thereof. The first adhesive layer 220 has one surface bonded to the lower surface of the waterproof layer 210, and has the other surface bonded to the upper surface of the support layer 230.

The first adhesive layer 220 can be also configured by bonding a thin film having an adhesive surface formed on a single surface thereof 222 (hereinafter, referred to as a single-sided adhesive film 222) and a hot melt 224, which forms a thermoplastic resin in a pellet shape or a film shape.

In this time, the first adhesive layer 220 can have the hot melt 224 located on one surface bonded to the waterproof layer 210, and has the adhesive surface of the single-sided adhesive film 222 located on the other surface bonded to the support layer 230 in order to increase the bonded force between the support layer 230 and the waterproof layer 210.

Herein, for example, the first adhesive layer 220 is formed by stacking the hot melt formed in a thickness of about 20 μm and the single-sided adhesive film formed in a thickness of about 75 μm, thus forming in a thickness of about 95 μm.

The support layer 230 can be composed of a metal of a mesh structure having a plurality of pores formed thereon (hereinafter, referred to as metal mesh) in order to provide waterproof performance at a high water pressure (e.g., about 10 atm or more).

Figure 7:
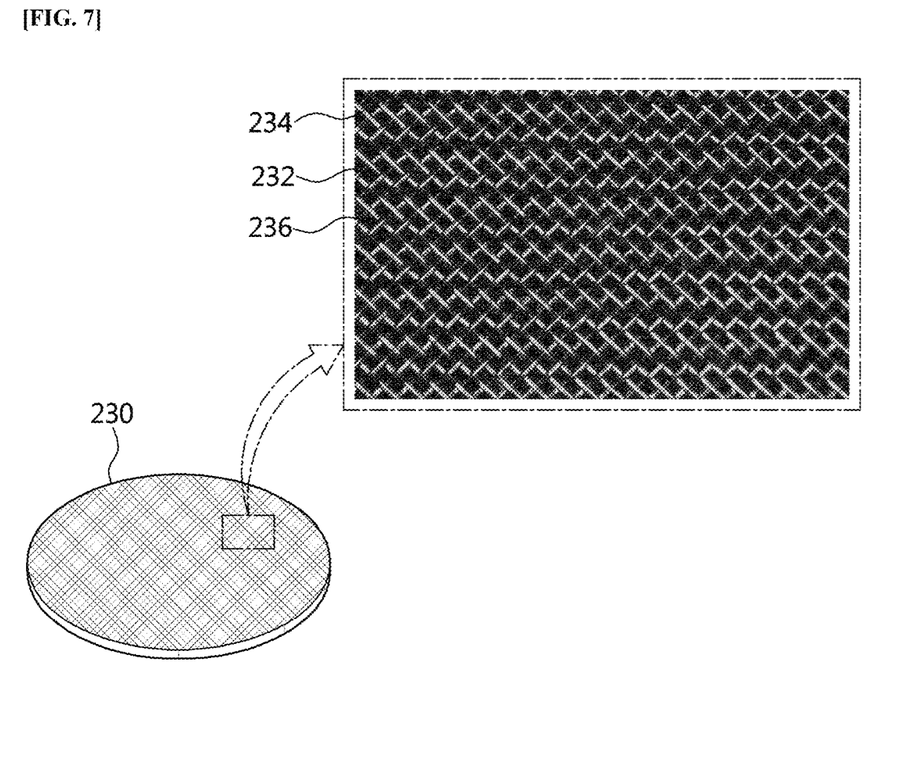
FIGS. 7 to 9 are diagrams for explaining the support layer of FIG. 6.

Referring to FIG. 7, the support layer 230 can be a metal mesh formed by crossing a plurality of metal wires.

For example, a plurality of first metal wires 232 are located in parallel, and a plurality of second metal wires 234 are located at a predetermined angle with the first metal wire 232. In this time, the second metal wire 234 intersects the upper and lower portions of the plurality of first metal wires 232 alternately.

Thereafter, the plurality of first metal wires 232 and the plurality of second metal wires 234 are press-rolled in the intersected state to manufacture the support layer 230 in a metal mesh shape. In this time, the support layer 230 is formed with a pore 236 in a predetermined size by the intersection of the first metal wire 232 and the second metal wire 234.

Figure 8:
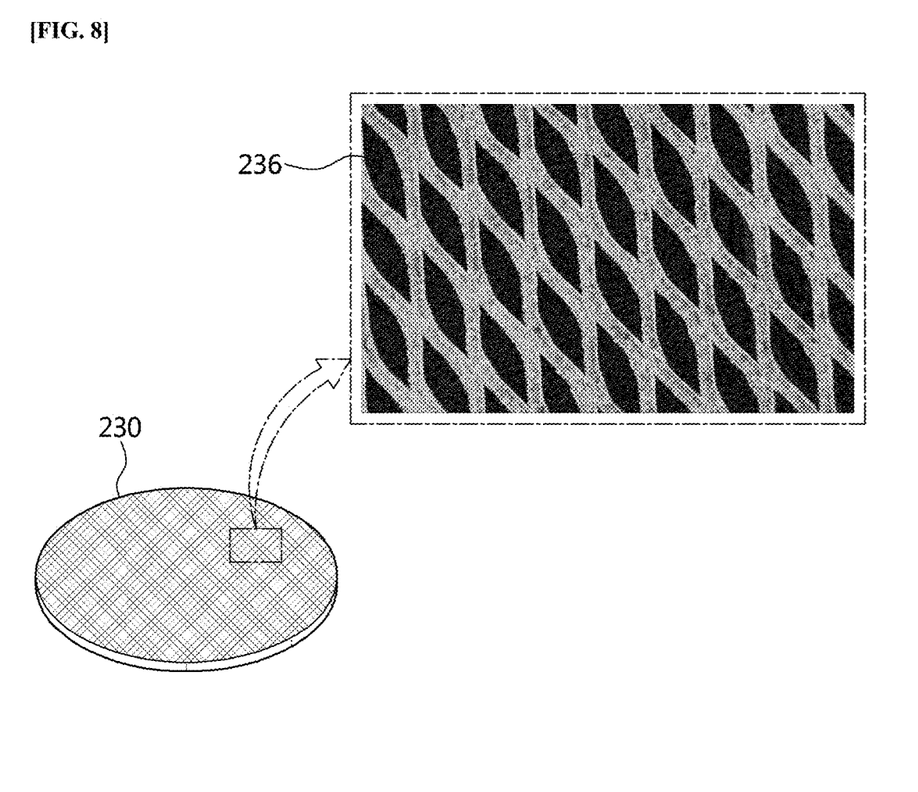

Referring to FIG. 8, the support layer 230 can be a metal mesh having a plurality of pores 236 formed on a thin film metal through a stamping process (or a punching process) using a metal mold or a laser.

The support layer 230 can be composed of a metal material such as SUS, aluminum, or an alloy of SUS and nickel (Ni). The support layer 230 can be formed to have a mesh structure of about 300 mesh to 800 mesh. Herein, 1 mesh is a numerical value indicating the number of graduations (pores) formed in 1 inch.

Figure 9:
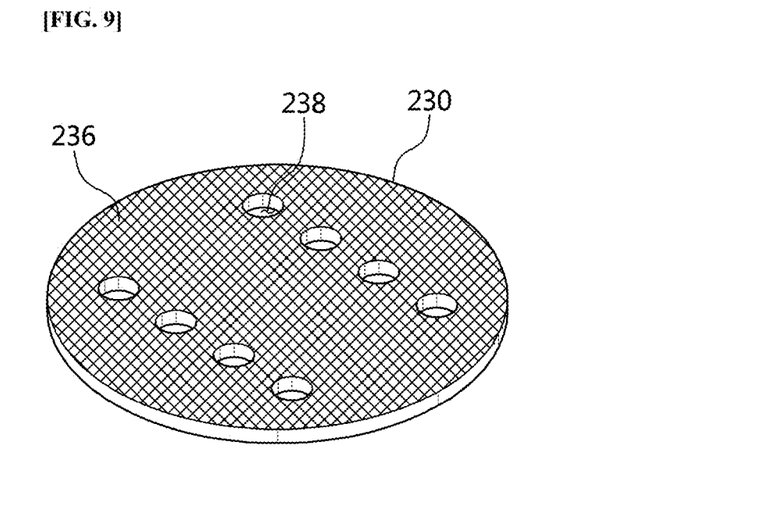

Referring to FIG. 9, a plurality of internal pressure transmission holes 238 can be formed on the support layer 230. The support layer 230 can be damaged or deformed due to the internal pressure of the space between the main body of the applied device and the support layer 230 when mounting the waterproof sound-transmitting sheet to the applied device.

Accordingly, the support layer 230 is formed with the internal pressure transmission hole 238 having a size greater than the pores 236 to discharge the internal pressure between the main body of the applied device and the support layer 230. Herein, the internal pressure transmission hole 238 is formed through a metal mold stamping process, a laser stamping process, etc.

Herein, the internal pressure transmission hole 238 has been illustrated as being formed in an elliptical shape in FIG. 9, but it is not limited thereto and can be formed in various shapes.

The second adhesive layer 240 is interposed between the upper surface of the support layer 230 and the applied device to bond the waterproof sound-transmitting sheet to the applied device. The second adhesive layer 240 can be formed of a thin film in various shapes such as a circular shape, an elliptical shape, a square shape, or a hexagonal shape according to the shape of the support layer 230. In this time, the second adhesive layer 240 can have a hole for sound transmission formed therein.

The second adhesive layer 240 can be also formed of a thin film having an adhesive surface on both surfaces thereof. The second adhesive layer 240 has one surface bonded to the upper surface of the support layer 230, and has the other surface bonded to the applied device.

The second adhesive layer 240 can be also configured by bonding a thin film having an adhesive surface formed on both surfaces thereof 242 (hereinafter, referred to as a double-sided adhesive film 242) and a thin film having an adhesive surface formed on one surface thereof 244 (hereinafter, referred to as a single-sided adhesive film 244). That is, the second adhesive layer 240 stacks the double-sided adhesive film 242 and the single-sided adhesive film 244 to form the second adhesive layer 240 having the adhesive surfaces formed on both surfaces thereof.

The double-sided adhesive film 242 has one surface bonded to the other surface of the single-sided adhesive film 244 (i.e., one surface where no adhesive surface is formed). The double-sided adhesive film 242 has the other surface bonded to the upper surface of the support layer 230. The single-sided adhesive film 244 has the other surface bonded to the one surface of the double-sided adhesive film 242. The single-sided adhesive film 244 has one surface bonded to the applied device.

Herein, FIG. 6 has illustrated that the double-sided adhesive film 242 is bonded to the upper surface of the support layer 230, and the single-sided adhesive film 244 is bonded to the upper surface of the double-sided adhesive film 242, but it is not limited thereto, and the single-sided adhesive film 244 can be bonded to the upper surface of the support layer 230 and the double-sided adhesive film 242 can be bonded to the upper surface of the single-sided adhesive film 244 to form the second adhesive layer 240.

Herein, for example, the second adhesive layer 240 is formed by stacking the double-sided adhesive film 242 formed in a thickness of about 30 μm and the single-sided adhesive film 244 formed in a thickness of about 50 μm, thus forming in a thickness of about 80 μm.

The third adhesive layer 250 is interposed between the lower surface of the waterproof layer 210 and the case 160 to bond the waterproof sound-transmitting sheet to the case 160 of the applied device. The third adhesive layer 250 can be formed of a thin film in various shapes such as a circular shape, an elliptical shape, a square shape, or a hexagonal shape according to the shape of the support layer 230. In this time, the third adhesive layer 250 can have a hole for sound transmission formed therein.

The third adhesive layer 250 can be formed of a thin film having an adhesive surface on both surfaces thereof. The third adhesive layer 250 has one surface bonded to the upper surface of the support layer 230, and has the other surface bonded to the applied device.

The third adhesive layer 250 can also have a carrier that is detachable (removable) adhered to the other surface thereof. That is, the third adhesive layer 250 is manufactured in the state where the carrier for protecting the adhesive force has been adhered before the waterproof sound-transmitting sheet is mounted on the applied device. After the carrier is removed, the third adhesive layer 250 is adhered to the case 160 by bonding the other surface thereof to the case 160 of the applied device.

Herein, for example, the third adhesive layer 250 is a double-sided adhesive film formed in a thickness of about 150 μm.

Hereinafter, waterproof performance of the waterproof sound-transmitting sheet in accordance with the first embodiment of the present disclosure and the waterproof sound-transmitting sheet in accordance with the second embodiment of the present disclosure will be described with reference to the accompanying drawings.

Figure 10:
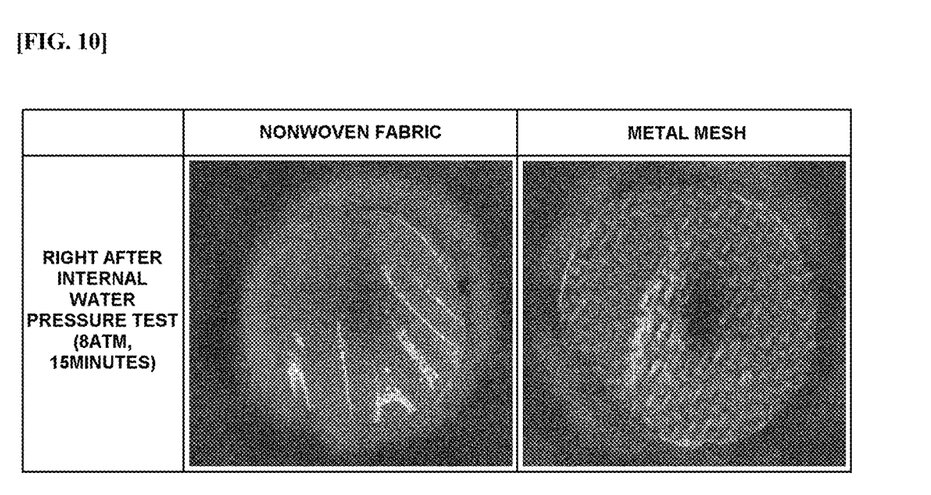
FIGS. 10 and 11 are diagrams for explaining waterproof performance of the waterproof sound-transmitting sheet in accordance with an embodiment of the present disclosure.
Figure 11:
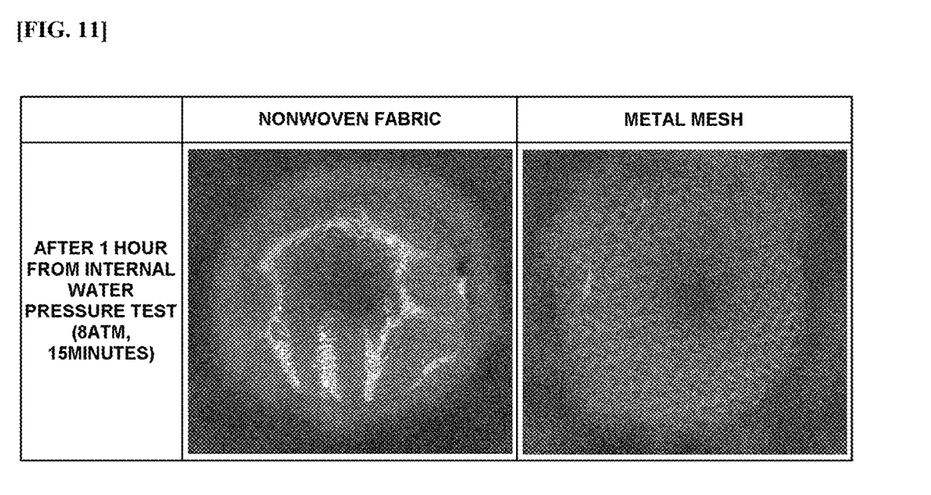

It is a diagram photographing the state of the waterproof layer 210 after the waterproof sound-transmitting sheet having the support layer 230 composed of nonwoven fabric and the waterproof sound-transmitting sheet having the support layer 230 composed of metal mesh were subjected to an internal water pressure test that applies a water pressure of about 8 atm for about 15 minutes.

Referring to FIG. 10, in the waterproof sound-transmitting sheet, stretch occurs in the waterproof layer 210 regardless of the material of the support layer 230 right after the internal water pressure test. In this time, when the waterproof sound-transmitting sheet keeps the waterproof layer 210 in the stretched state, waterproof performance reduces, such that the restoring force of the waterproof layer 210 is an important factor affecting waterproof performance.

Referring to FIG. 11, in the waterproof sound-transmitting sheet having the support layer 230 composed of nonwoven fabric, the waterproof layer 210 is not restored even after 1 hour from the internal water pressure test, while in the waterproof sound-transmitting sheet having the support layer 230 composed of metal mesh, the waterproof layer 210 is restored to its original state after 1 hour from the internal water pressure test.

As a result, it can be seen that the waterproof sound-transmitting sheet can maintain waterproof performance at a higher pressure in the support layer 230 composed of metal mesh than in the support layer 230 composed of nonwoven fabric.

In this time, in the waterproof sound-transmitting sheet using nonwoven fabric as the support layer 230, waterproof performance reduces at an internal water pressure of 8 atm, but waterproof performance can be maintained at an internal water pressure of 5 atm or less.

Accordingly, nonwoven fabric or metal mesh can be selectively applied as the material of the support layer 230 according to waterproof performance required by the applied device.

As described above, although preferred embodiments of the present disclosure have been described, it is to be understood that they can be modified into various forms, and various modifications and changes thereof can be embodied by those skilled in the art to which the present disclosure pertains without departing from the scope of the present disclosure.

The invention claimed is:

1. A waterproof sound-transmitting sheet configured to be mounted in an applied device, comprising:
a waterproof layer formed in a film shape;
a first adhesive layer located on the lower portion of the waterproof layer; and
a support layer composed of a porous material and located on the lower portion of the first adhesive layer,
wherein the waterproof layer is configured to be located toward an acoustic hole formed on a case of the applied device,
wherein the support layer is a selected one of metal mesh and nonwoven fabric, and is configured to be located toward a microphone or a speaker module located in the applied device,
wherein a hole is formed through the first adhesive layer, and the waterproof layer and the support layer are spaced apart from each other through the hole of the first adhesive layer,
wherein the support layer has a same shape and a same area as the waterproof layer so as to be arranged over the waterproof layer in an entire area corresponding to the hole, and
wherein a stretch of the waterproof layer is maintained within a spacing interval formed by the hole of the first adhesive layer between the waterproof layer and the support layer.

2. The waterproof sound-transmitting sheet of claim 1, wherein the metal mesh is a shape having a plurality of pores punched on a thin film metal plate that is a selected one of SUS, aluminum (Al), and an alloy of the SUS and nickel (Ni).

3. The waterproof sound-transmitting sheet of claim 1, wherein the metal mesh has a metal wire, which is a selected one of SUS, aluminum (Al), and an alloy of the SUS and nickel (Ni), formed to intersect.

4. The waterproof sound-transmitting sheet of claim 1, wherein the support layer is formed with an internal pressure transmission hole for transmitting the internal pressure between an applied device and the support layer to the outside.

5. The waterproof sound-transmitting sheet of claim 1, wherein the waterproof layer is a nonporous material.

6. The waterproof sound-transmitting sheet of claim 1, wherein the support layer is nonwoven fabric containing one selected from polyethylene terephthalate (PET), polypropylene (PP), polyethylene (PE), and Nylon.

7. The waterproof sound-transmitting sheet of claim 1, wherein the waterproof layer is one selected from latex, Polyurethane (PU), and Thermoplastic Poly Urethane (TPU) that have elasticity.

8. The waterproof sound-transmitting sheet of claim 1, wherein the waterproof layer is a membrane that is formed by spinning the spinning solution containing a polymer material on a web through electrospinning.

9. The waterproof sound-transmitting sheet of claim 1, wherein the first adhesive layer comprises
a single-sided adhesive film located on the lower surface of the waterproof layer; and
a hot melt interposed between the single-sided adhesive film and the waterproof layer.

10. The waterproof sound-transmitting sheet of claim 1, further comprising a second adhesive layer interposed between the support layer and a speaker or a microphone of an applied device,
wherein the second adhesive layer is formed with a hole for sound-transmission.

11. The waterproof sound-transmitting sheet of claim 10, wherein the second adhesive layer comprises
a double-sided adhesive film located on the lower portion of the support layer; and
a single-sided adhesive film interposed between the double-sided adhesive film and the speaker or the microphone.

12. The waterproof sound-transmitting sheet of claim 1, further comprising a third adhesive layer interposed between the waterproof layer and a case of an applied device,
wherein the third adhesive layer is formed with a hole for sound transmission.

* * * * *